United States Patent [19]
Mertz

[11] Patent Number: 5,643,634
[45] Date of Patent: Jul. 1, 1997

[54] PROCESS FOR THE TREATMENT OF GLASS TO IMPROVE ITS ADHESION TO A POLYMER

[75] Inventor: Frederic Mertz, Deparis, France

[73] Assignee: Saint-Gobain Emballage, Courbevoie, France

[21] Appl. No.: 520,983

[22] Filed: Aug. 30, 1995

[30] Foreign Application Priority Data

Aug. 30, 1994 [FR] France .................... 94 10398

[51] Int. Cl.$^6$ .............................. C23C 16/18; C23C 16/40
[52] U.S. Cl. .................. 427/255; 427/255.5; 427/255.7; 427/407.2; 427/419.5; 65/60.2; 65/60.51; 65/60.7; 156/69
[58] Field of Search .................. 427/255, 255.5, 427/255.7, 269, 407.2, 419.5, 427; 65/60.2, 60.51, 60.7; 156/69, 497; 215/232, DIG. 2

[56] References Cited

U.S. PATENT DOCUMENTS

| | | | |
|---|---|---|---|
| 4,311,247 | 1/1982 | Dembicki et al. | 215/232 |
| 4,389,266 | 6/1983 | Dembicki et al. | 156/69 |
| 4,421,580 | 12/1983 | Dembicki et al. | 156/69 |
| 4,431,692 | 2/1984 | Hofmann et al. | 428/35 |
| 5,498,758 | 3/1996 | Scholes et al. | 427/255 |

FOREIGN PATENT DOCUMENTS 0 620 202  10/1994  France .
2 139 997  11/1984  United Kingdom .

OTHER PUBLICATIONS

Lewis, *Hawley's Condensed Chemical Dictionary*, 12th Ed. Van Nostrand Reinhold Co, New York, 1993. (month unknown).

*Primary Examiner*—Shrive Beck
*Assistant Examiner*—Timothy Meeks
*Attorney, Agent, or Firm*—Oblon, Spivak, McClelland, Maier & Neustadt, P.C.

[57] ABSTRACT

A process for the treatment of glass in order to improve the adhesion of a polymer to the glass, wherein the process involves depositing a metal oxide layer on a surface of the glass article, and depositing a soluble aluminum salt layer on at least a portion of the metal oxide layer wherein the portion of the metal oxide layer is the portion to which the polymer is desired to adhere, the glass article produced from the process and an apparatus for performing the process, wherein the process provides excellent adhesion between the glass and a polymeric seal used in heat sealing.

11 Claims, 2 Drawing Sheets

FIG_1

PROCESS FOR THE TREATMENT OF GLASS TO IMPROVE ITS ADHESION TO A POLYMER

BACKGROUND OF THE INVENTION

1. Field of the Invention

The present invention relates to a process for the treatment of glass in order to improve the adhesion of a polymer to the glass.

2. Discussion of the Background

Different solutions making it possible to improve the adhesion of polymers to glass have been described in the prior art. The problem encountered by many of these solutions is that glass-polymer adhesion is not obtained in a satisfactory manner.

French patent 2,519,956 describes a process consisting of depositing on the lip of a hollow glass object, a coating of tin oxide, onto which is then deposited a chromium complex in order to ensure a stronger bond between glass and polymer. This procedure offers satisfactory results, but requires very difficult conditions with respect to the deposition of the chromium complex, due to instability of the chromium complex.

The process requires precise control of the pH and temperature of the chromium complex solution in order to provide good durability of the complex.

French patent application No. FR 9,304,329 discloses a glass treatment which also requires difficult conditions. It proposes a two-stage treatment consisting of the deposition of a metal oxide coating and the deposition of a coating of a soluble chromium salt, such as chromium nitrate. While the heat sealing results obtained with this treatment are completely satisfactory, again the treatment is extremely difficult to perform satisfactorily.

Certain applications requiring a very high temperature, particularly for decoration, cannot be coated with a chromium-based solution, which is proscribed at very high temperatures.

European patent 158,830 describes another type of treatment for glass containers which are to be ultimately heat sealed. EP 158,830 provides a process consisting of depositing a composition containing at least one resin amide or acrylic bond. However, the heat sealing results obtained with this process are not always satisfactory.

SUMMARY OF THE INVENTION

Accordingly, one object of the present invention is to provide a process for the treatment of the lip of hollow, and in particular alimentary, cosmetic and pharmaceutical objects made from glass, permitting the heat sealing of a polymeric seal to the lip in a durable manner and permitting removal under satisfactory conditions.

A further object of the present invention is to provide a process for treating a variety of types of glass, such as soda-lime, borosilicate and opal glass, to improve the adhesion of the glass to polymers, especially polymeric seals.

A further object of the present invention is to provide an apparatus for performing the treatment process of the present invention.

A further object of the present invention is to provide a glass object, preferably a hollow glass container, treated by the process of the present invention which has excellent heat sealing properties, especially on the lip of the glass container, and especially for post treatment exposure to high temperatures of from 100° C. up to the softening point of the glass.

These and other objects of the present invention have been satisfied by the discovery of a process for the treatment of glass to improve heat sealing between the glass and a polymer, comprising depositing a metal oxide layer and surface of the glass, followed by depositing a soluble aluminum salt layer on at least that portion of the metal oxide layer to which the polymer is desired to adhere.

BRIEF DESCRIPTION OF THE FIGURES

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

The present invention relates to a process for the treatment of glass, preferably the lip of hollow glass objects, such as jars, cups, bottles, flasks, etc. in order to permit the adhesion of a polymer to the glass, preferably the adhesion of a polymeric seal to the lip of the hollow glass object. The seal is generally formed by adhesion between an aluminum film and a polymer film. The polymer film is heat-fusible and serves as an adhesive adhering the seal to the container.

The lip of a hollow glass object corresponds to the peripheral area of the glass object defining its opening and more particularly the area on which heat sealing takes place.

According to a preferred embodiment of the present invention the deposition of the soluble or partly water-soluble aluminum salt takes place by coating. Within the context of the present invention, the term salt is used to denote any mineral or organic compound containing an aluminum atom or ion.

The preferred solution consists of a coating based on aluminum nitrate, or other aluminum salts such as aluminum lactate and aluminum acetate, which also offer good results. The soluble aluminum salt is most preferably aluminum nitrate $Al(NO_3)_3 \cdot 9\ H_2O$. It is preferably used as an aqueous solution having a soluble aluminum salt content between 0.14 and 14% by weight, most preferably 1.4% by weight.

The metal oxide layer can be deposited by conventional methods, such as chemical vapor deposition or by the spraying of solutions of metal salts. The metal oxide is preferably tin oxide or titanium oxide.

The present process makes it possible to obtain a satisfactory and durable glass-polymer adhesion after heat sealing for various types of polymers conventionally used on seals and for a variety of types of glass.

The present process can also be used on containers which are subsequently to be subjected to a high temperature, e.g. a glass decoration.

The present invention also relates to an apparatus for performing the present process. The apparatus of the present invention comprises means for depositing a metal oxide layer and means for depositing an aluminum salt layer. The means for depositing an aluminum salt layer is preferably a coating device, such as a coating or applicator roller.

Preferably, the means for depositing a metal oxide layer is a hood for chemical vapor deposition or for spraying metal salt solutions.

Figure 1:
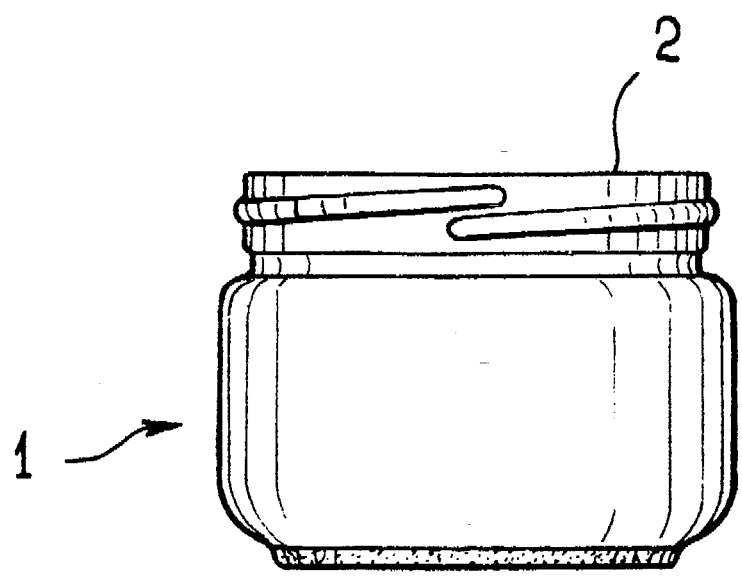
FIG. 1 a depiction of an example of the jar 1 having a lip 2 to be treated according to the present invention.

In FIG. 1, the lip 2 of the jar 1 is the area to be treated and onto which the seal is to undergo heat sealing.

Figure 2:
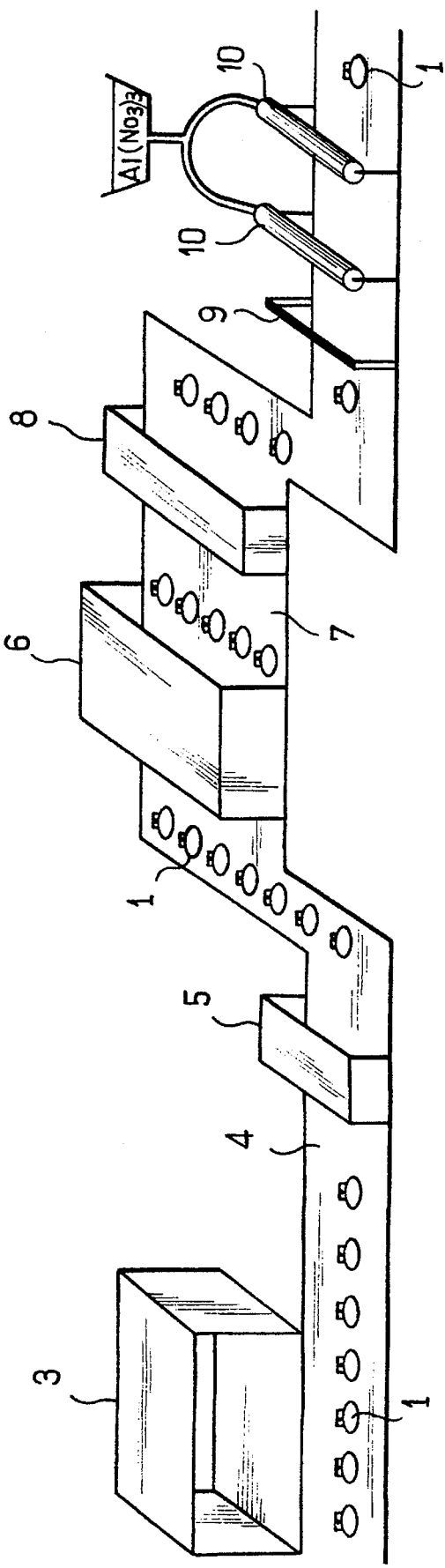
FIG. 2 is a diagram of an apparatus for performing the process according to the present invention, showing jars 1, forming machine 3, belt 4, first hood 5, annealing layer 6, wide conveyor 7, second hood 8, burner 9 and applicator rollers 10.

The apparatus of FIG. 2 shows the still hot jars conveyed on a belt 4, on leaving the forming machine 3. The jars 1 undergo the first phase of the treatment, which is the deposition of a metal oxide layer, such as a layer of tin oxide or titanium oxide.

This deposition can be performed, for example, by chemical vapor deposition of tin tetrachloride. Deposition takes place preferably under a first hood 5, where tin tetrachloride is injected in a hot atmosphere, the jars having a temperature between 400° and 600° C. The residence time of the jars below the hood is a few seconds and is sufficient for the pyrolysis of the tin tetrachloride, which leads to a tin oxide layer. For the deposition of a titanium oxide layer, use is made of titanium tetrachloride and the same type of operation is carried out.

Following the deposition of the metal oxide layer, the jars 1 pass through an annealing layer 6, where they are slowly annealed. The annealing layer 6 is preferably of the tunnel type. The temperature of the jars on leaving annealing layer 6 is between 70° and 130° C. The residence time of the jars in the annealing layer 6 is about 30 to 60 minutes.

In order to allow this residence time, the jars pass through in line on a wider conveyor 7 instead of one by one. For this purpose use is made of different conveyor belts able to move at different speeds, so that it is possible, using conventional methods, to group the jars by an arrangement of said belts.

In the present invention, it is standard practice for the jars to undergo a treatment in a second hood 8, which supplies a lubricant to the jar on leaving the annealing layer 6. This lubricant can be supplied by the vaporization of a fatty acid, such as an oleic acid, or by spraying waxes or polyethylene esters. This treatment makes it possible for the jars to rub against one another reducing the risks of scratching during manipulations occurring during filling or handling.

The attachment of the lubricant to the jar is facilitated by the presence of the metal oxide, which has been pyrolyzed on the entire jar. However, the presence of lubricant on the jar lip 2 is prejudicial to the deposition of an aluminum nitrate layer.

It is therefore necessary to eliminate the lubricant which has been deposited on the lip 2. For this purpose and with the jars again travelling one by one as a result of an arrangement of the belts, the lubricant is removed by burning by conventional means such as a burner 9. The burner is shown in a transverse position with respect to the flow of the jars, but it can also be located in any position and in particular parallel to the conveyor advance axis. It is also possible to provide several burners. This treatment is very brief so as to eliminate the lubricant layer and raise the temperature of the lip, particularly for eliminating water supplied by the subsequent treatment.

The second phase of the treatment is then applied and comprises depositing an aluminum salt layer preferably aluminum nitrate. This layer is applied to the lip 2 of the jar 1, e.g., by use of one or more applicator rollers 10. This is followed by a humidity or moisture check, e.g. by conductivity measurement or infrared measurement, as well as a check on the temperature of the lip, which should be between 100° and 120° C. The latter check can be performed e.g. by a contact pyrometer. These two checks are not shown in the drawings.

Thus, the apparatus performs the two steps of the present method, namely the deposition of a layer of metal oxide, and the deposition of a layer of a soluble aluminum salt.

Having generally described this invention, a further understanding can be obtained by reference to certain specific examples which are provided herein for purposes of illustration only and are not intended to be limiting unless otherwise specified.

EXAMPLES

Tests were performed on soda-lime glass yogurt jars, having a lip width of approximately 4 millimeters.

The lip of the jars underwent the following treatment:

deposition of a tin oxide layer with an average thickness of 40 Ctu and at least exceeding 25 Ctu, deposition of a layer of an adhesion promoting agent at a rate of 1 liter of solution for approximately 300,000 jars.

The following adhesion promoting agents were tested: complexes of chromium and fumaric acid with a concentration of 0.23 g Cr III/l; chromium nitrate $(Cr(NO_3)_3 \cdot 9 H_2O)$ with a concentration of 2 g Cr III/l; and aluminum nitrate $(Al(NO_3)_3 \cdot 9 H_2O)$ with a concentration of 1 g Al III/l.

Before carrying out heat sealing, the coated jars were aged. The aging process consisted of an aging having a duration Jo=7 days. The jars then underwent an accelerated aging in a climatic oven (55° C., 75% humidity) lasting 7 or 15 days. This treatment made it possible to simulate aging during a long storage of the jars prior to their use by the consumer.

The jars were then heat sealed with the aid of a type T.C.S. ML 13 heat sealing machine (heating power: 640 W, principle:conduction). The heat sealing parameters were sealing pressure=5 bars, sealing time=1.5 seconds and sealing temperature=290° C. displayed (or 270° C. measured on the lip).

The jars were filled ⅔ with water and then heat sealed. They were then placed in an inverted position (top at the bottom) in a water bath at 55° C. for 30 minutes. Under severe and unfavorable conditions, this simulates the effect of the contents of the jar on the adhesion.

The lift-off (tearing off of the seal) took place after one night. The lift-off was performed at 90° C. with a drawing-off rate of 20 millimeters per minute.

The results obtained correspond to the measurement of the adhesion force obtained by this lift-off test. More specifically, it is the flow force F, expressed in N/cm, i.e. the force exerted between the initial and final tearing off phases.

The tests were carried out with the aid of two heat sealing films manufactured by l'Alsacienne D'Aluminium and carrying the references 1702 and 122. The following results were obtained:

| | Film 1702: F in N/cm. | | |
|---|---|---|---|
| Aging | Solution Chromium complex | Chromium nitrate | Aluminum nitrate |
| Jo | 21.0 + 1.1 | 21.6 + 1.7 | 22.0 + 3.0 |
| Jo +7 | 12.6 + 4.0 | 10.5 + 1.3 | 19.0 + 2.4 |

-continued

Film 1702: F in N/cm.

| Aging | Solution Chromium complex | Chromium nitrate | Aluminum nitrate |
|---|---|---|---|
| Jo +15 | 8.6 + 0.7 | 7.2 + 0.5 | 18.0 + 3.8 |

Film 122: F in N/cm.

| Aging | Solution Chromium complex | Chromium nitrate | Aluminum nitrate |
|---|---|---|---|
| Jo | 10.4 + 1.6 | 15.6 + 1.5 | 12.0 + 2.7 |
| Jo +7 | 6.0 + 1.2 | 8.9 + 2.4 | 9.3 + 1.3 |
| Jo +15 | 5.8 + 1.2 | 8.3 + 2.5 | 10.0 + 3.8 |

Each test was carried out on several jars, and the results are reported as a mean value, with the margin of error being indicated in each case.

As shown in these results, the process according to the present invention leads to satisfactory heat sealing. Thus it is possible to compare the results with those relative to the treatment based on the chromium complex, itself considered to be satisfactory.

Thus, the process according to the present invention is comparable with the prior art process with regards to the results obtained, but it is much easier to carry out. It requires no special performance conditions, whereas the prior art procedure and in particular the use of the chromium complex is subject to very strict conditions, which are often difficult to achieve and perform in an industrial environment.

In addition, the tests performed after aging, i.e. for which a clearly defined time has elapsed between the treatment and the heat sealing, reveal the industrial feasibility of the process and products obtained. Thus, these post-aging tests are important, because in general the jars are treated by the manufacturer and supplied to the user who, after a storage period, will carry out heat sealing. Thus it must be ensured that the heat sealing can be performed effectively. The present treatment is insensitive to aging or at least very stable in time.

Obviously, additional modifications and variations of the present invention are possible in light of the above teachings. It is therefore to be understood that within the scope of the appended claims, the invention may be practiced otherwise than as specifically described herein.

This application is based on French Patent Application 94-10398, filed with the French Patent Office on Aug. 30, 1994, the entire contents of which are hereby incorporated by reference.

What is claimed as new and desired to be secured by letters patent of the united states is:

1. A process for preparing a glass artical for adhesion to a polymer film comprising:
   depositing a metal oxide layer on a surface of the glass article, and
   depositing a water-soluble aluminum salt layer of aluminum nitrate, aluminum lactate or aluminum acetate from an aqueous solution of said salt on at least a portion of the metal oxide layer wherein said portion of the metal oxide layer is the portion to which the polymer is desired to adhere.

2. The process according to claim 1, wherein said soluble aluminum salt is aluminum nitrate $Al(NO_3)_3 \cdot 9\ H_2O$.

3. The process according to claim 2, wherein said aluminum nitrate is deposited from an aqueous solution of aluminum nitrate having a content of aluminum nitrate of from 0.14 to 14% by weight of solution.

4. The process according to claim 3, wherein the content of aluminum nitrate is 1.4% by weight of solution.

5. The process according to claim 1, wherein the deposition of the metal oxide layer is performed by chemical vapor deposition or by spraying of a solution of one or more metal salts.

6. The process according to claim 1, wherein the metal oxide is a member selected from the group consisting of tin oxide and titanium oxide.

7. The process according to claim 1, wherein said water-soluble aluminum salt is aluminum lactate.

8. The process according to claim 1, wherein said water-soluble aluminum salt is aluminum acetate.

9. The process according to claim 1, wherein the content of said water-soluble aluminum salt is from 0.14 by weight to 14% by weight of said aqueous solution of aluminum salt.

10. The process according to claim 1, wherein the content of said water-soluble aluminum salt is 1.4% by weight of said aqueous solution of said aluminum salt.

11. A process for adhering a glass article to a polymer film comprising:
    depositing a metal oxide layer on a surface of the glass article,
    depositing a water-soluble aluminum salt layer of aluminum nitrate, aluminum lactate or aluminum acetate from an aqueous solution of said salt on at least a portion of the metal oxide layer wherein said portion of the metal oxide layer is the portion to which the polymer film is desired to adhere, and
    applying a polymer film to said portion of the metal oxide layer to which the polymer film is desired to adhere.

* * * * *